United States Patent
Sumetsky

(10) Patent No.: US 8,353,061 B2
(45) Date of Patent: Jan. 8, 2013

(54) NEAR-FIELD SCANNING OPTICAL MICROSCOPY WITH NANOSCALE RESOLUTION FROM MICROSCALE PROBES

(75) Inventor: Mikhail Sumetsky, Bridgewater, NJ (US)

(73) Assignee: OFS Fitel, LLC, Norcross, GA (US)

( * ) Notice: Subject to any disclaimer, the term of this patent is extended or adjusted under 35 U.S.C. 154(b) by 551 days.

(21) Appl. No.: 12/387,642

(22) Filed: May 4, 2009

(65) Prior Publication Data
US 2009/0276923 A1   Nov. 5, 2009

Related U.S. Application Data

(60) Provisional application No. 61/049,878, filed on May 2, 2008.

(51) Int. Cl.
*G01Q 60/22* (2010.01)
(52) U.S. Cl. .................. 850/32; 850/9; 850/10; 73/105; 250/234; 250/235
(58) Field of Classification Search .............. 850/9, 10, 850/32; 73/105; 259/234, 235; 250/234, 250/235
See application file for complete search history.

(56) References Cited

U.S. PATENT DOCUMENTS

| | | | |
|---|---|---|---|
| 5,789,742 A * | 8/1998 | Wolff ..................... | 250/227.11 |
| 6,046,972 A | 4/2000 | Kuroda et al. | |
| 6,469,288 B1 | 10/2002 | Sasaki et al. | |
| 6,490,039 B2 | 12/2002 | Maleki et al. | |
| 6,583,399 B1 | 6/2003 | Hunziker et al. | |
| 6,744,030 B2 | 6/2004 | Mitsuoka et al. | |
| 6,795,481 B2 | 9/2004 | Maleki et al. | |
| 6,922,497 B1 | 7/2005 | Savchenkov et al. | |
| 6,995,367 B2 | 2/2006 | Miyamoto | |
| 7,218,803 B1 | 5/2007 | Sumetsky | |
| 2004/0196465 A1 | 10/2004 | Arnold et al. | |
| 2004/0238744 A1 | 12/2004 | Arnold et al. | |
| 2006/0062508 A1 | 3/2006 | Guo et al. | |
| 2006/0239606 A1 | 10/2006 | Stecker | |

OTHER PUBLICATIONS

Frey H.G., Keilmann, F., Kriele, A and Guckenberger R., "Enhancing the resolution of a scanning near-field optical microscopy by a metal tip grown on an aperture probe" App. Phys. Lett, vol. 81,No. 26, pp. 5030 to 5032, 2002.*

(Continued)

*Primary Examiner* — Jack Berman
*Assistant Examiner* — Meenakshi Sahu

(57) ABSTRACT

To date, the probes of scanning near-field optical microscopes were aimed at creating electromagnetic field characteristics that are maximally localized near a nano-sized point (miniature apertures and tips, fluorescent nano-particles and molecules, dielectric and metal corners). Alternatively, the probe field, which is distributed within a larger area, can ensure the super-resolution as well. For this purpose, the field spectrum should be enriched with high spatial frequencies corresponding to small sample dimensions. As examples of such near-field probes, we propose and theoretically study the models of optical fibers with end-faces containing sharp linear edges and randomly distributed nanoparticles. These probes are more robust than the conventional probes and their fabrication is not concerned with nanoscale precision. The probes enable waveguiding of light to and from the sample with marginal losses distributing and utilizing the incident light more completely. Numerical modeling shows that, even with substantial measurement noise, the suggested probes can resolve objects that are significantly smaller than the probe size and, in certain cases, can perform better than miniature nanoprobes.

27 Claims, 6 Drawing Sheets
(5 of 6 Drawing Sheet(s) Filed in Color)

OTHER PUBLICATIONS

L. Novotny and B. Hecht, "Principle of Nano-Optics". Physics Today. (2007) p. 62.

M. Sumetsky, Y. Dulashko and D. J. DiGiovanni. "Opical Surface Microscopy with a Moving Microsphere". Optical Society of America. (2006).

G. S. Wiederhecker, C. M. B. Cordeiro, F. Couny, F. Benabid, S. A. Maier, J. C. Knight, C. H. B. Cruz and H. L. Fragnito. "Field Enhancement Within an Optical Fibre with a Subwavelength Air Core". Nature Photonics. (2007). pp. 115-118.

A. Ozcan, E. Cubukcu, Alberto Bilenca, B. Bouma, F. Capasso and G. Tearney. "Differential Near-Field Scanning Optical Microscopy Using Sensor Arrays". IEEE Journal of Selected Topics in Quantum Electronics. (2007). pp. 1719-1729.

L. Tong, L. Hu, J. Zhang, J. Qiu, Q. Yang, J. Lou, Y. Shen, J. He and Z. Ye. "Photonic Nanowires Directly Drawn From Bulk Glasses". Optic Express. (2006). vol. 14, No. 1.

P. Russell. "Photonic-Crystal Fibers". Journal of Lightwave Technology. (2006). pp. 4729-4749.

T. R. Matzelle, H. Gnaegi, A. Ricker and R. Reichelt. "Characterization of the Cutting Edge of Glass and Diamond Knives for Ultramicrotomy by Scanning Force Microscopy Using CAntilevers with a Defined Tip Geometry. Part II." Journal of Microscopy. (2002). vol. 209, Pt. 2. pp. 113-117.

A. Ozcan, E. Cubukcu, Alberto Bilenca, B. Bouma, F. Capasso and G. Tearney. "Differential Near-Field Scanning Optical Microscopy". Nano Letters. (2006). vol. 6, No. 11. pp. 2609-2616.

J. Greffet and R. Carminati. "Image Formation in Near-Field Optics". Progress in Surface Science. (1997). vol. 56, No. 3. pp. 133-237.

L. Tong, R. Gattass, J. Ashcom, S. He, J. Lou, M. Shen, I. Maxwell and E. Mazur. "Subwavelength-Diameter Silica Wires for Low-loss Optical Wave Guiding". Letter to Nature. (2003). vol. 426. pp. 816-819.

A. Mazzei, S. Götzinger, . de S. Menezes, V. Sandoghdar, and O. Benson. "Optimization of Prism Coupling to High-Q Modes in a Microsphere Resonator Using a Near-Field Probe". Optical Communications. (2005). pp. 428-433.

S. Götzinger, O. Benson, and V. Sandoghdar. "Influence of a Sharp Fiber Tip on High-Q Modes of a Microsphere Resonator." Optics Letter. (2002). vol. 27, No. 2. pp. 80-82.

A. Mazzei, S. Gotzinger, L.de S.Menezes, V. Sandoghdar, O. Benson "Optimization of Prism Coupling to High-Q Modes in a Microsphere Resonator Using a Near-field Probe" Optics Communication 250 (2005) pp. 428-433.

S. Gotzinger, O. Benson, V. Sandoghdar, "Influence of a Sharp Fiber Tip on High-Q Modes of a Microsphere Resonator", Optics Letters, vol. 27, No. 2, Jan. 15, 2002.

* cited by examiner

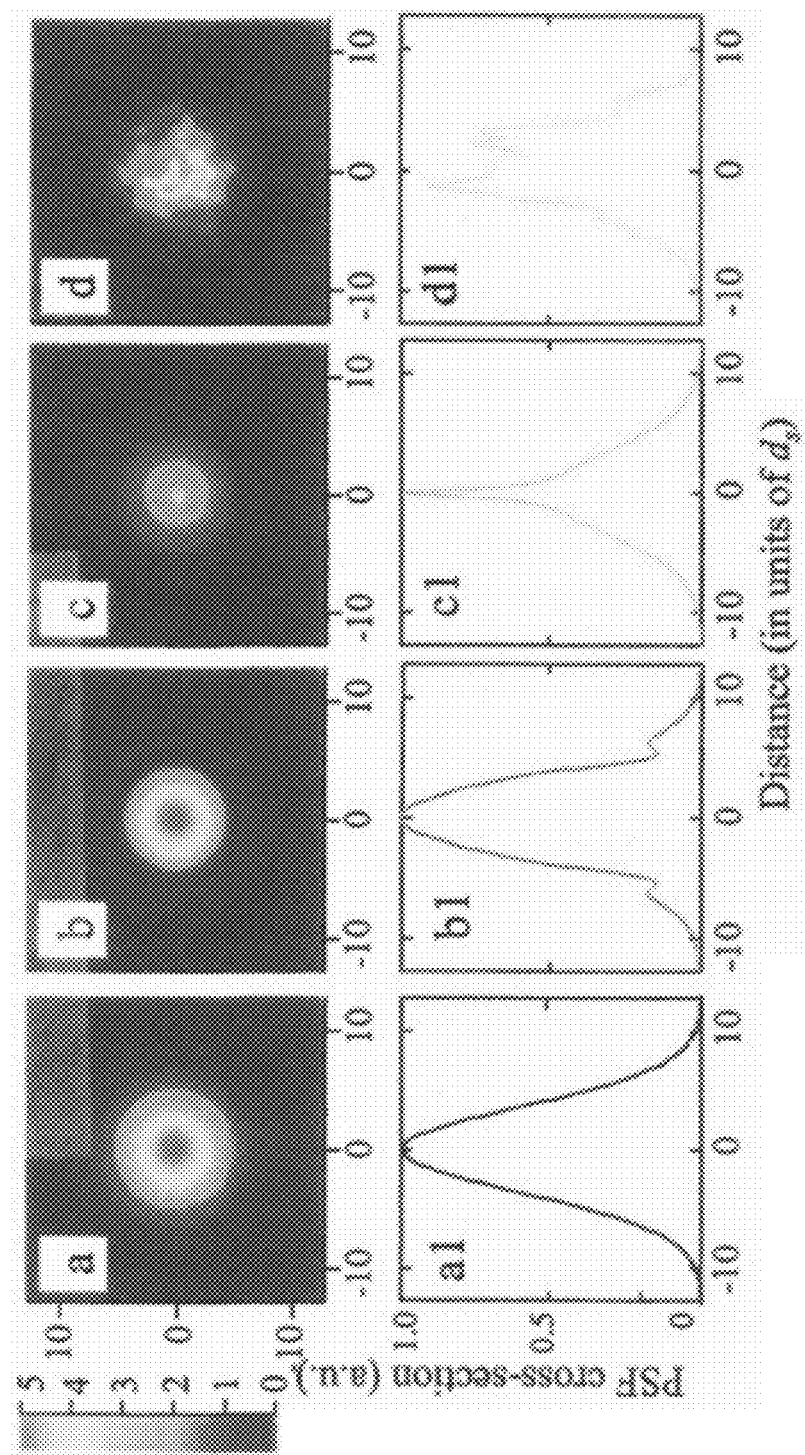
FIGURES 4a – 4d1

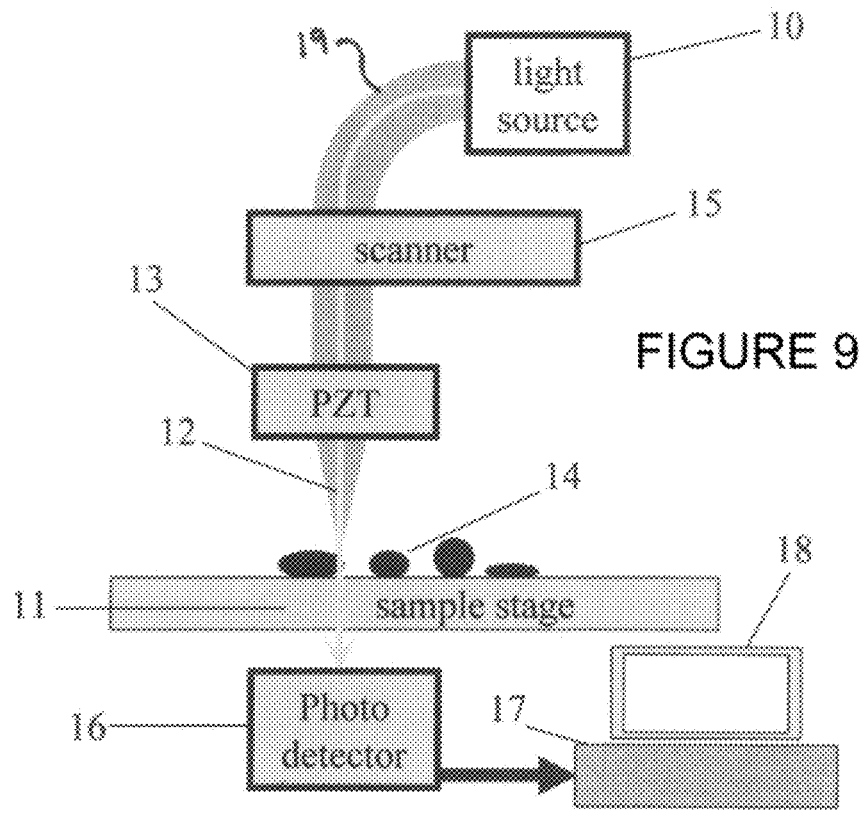
FIGURE 9
FIGURE 10a
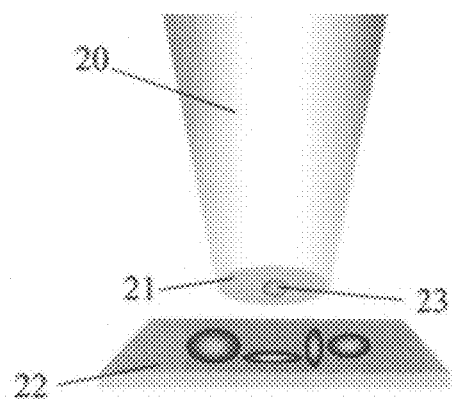
FIGURE 10b
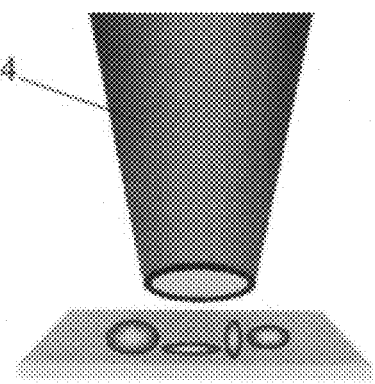

NEAR-FIELD SCANNING OPTICAL MICROSCOPY WITH NANOSCALE RESOLUTION FROM MICROSCALE PROBES

CROSS-REFERENCE TO RELATED APPLICATIONS

This application is related to and claims priority from U.S. Provisional Application Ser. No. 61/049,878 filed May 2, 2008, which is incorporated herein by reference.

STATEMENT REGARDING FEDERALLY SPONSORED RESEARCH

Not Applicable.

FIELD OF THE INVENTION

This invention relates to near-field scanning optical microscopy ("NSOM") and, in particular, to an improved probe for such microscopy and to an improved microscope using the probe.

BACKGROUND OF THE INVENTION

Near-field scanning optical microscopy ("NSOM") is a key technology for optically imaging nanoscale features in the sub-200 nanometer range. Conventional optical microscopy is limited in resolution to about one-half a wavelength of the illuminating light, NSOM microscopes, in contrast, can resolve features much smaller than the illuminating wavelength. For example, it is very difficult to obtain sub-500 nanometer resolution with conventional microscopes, but NSOM microscopes can resolve features of 25 nanometers or less. Such high resolution permits images of important macromolecules and cell components.

When an object is illuminated with electromagnetic radiation in the form of light it interacts with the radiation and responds with radiation components of two types: traveling wave radiation which travels many wavelengths distance with relatively small attenuation (far-field radiation) and evanescent radiation which attenuates exponentially with distance from the object and typically drops to undetectable levels within a distance of a few wavelengths from the object (near-field radiation). In imaging an object, conventional optical microscopy uses only far-field radiation that has traveled several wavelengths or more from the object. Consequently the image is created by only the traveling waves. Without the further information provided by the near-field radiation, nanoscale features are not resolved. These details are obscured by diffraction of the far-field waves.

NSOM microscopes, in contrast, position a probe within a fraction of wavelength from the object. This close to the object, the near-field light has measureable effects. The probe interacts with the object to produce measureable effects on the far-field response. These measureable effects can be seen by spectral analysis of the light returned from the illuminated sample/probe system. By scanning the probe laterally over the sample, the effects can be measured for each point over the sample and the resulting measurements can be processed into an image by appropriate "deconvolution algorithms" to provide an image of nanoscale features.

Referring to the drawings, FIG. 9 is a schematic diagram of a typical NSOM microscope comprising an illumination light source 10, a sample stage 11, and a near-field optical probe 12. Positioning mechanism 13 positions the probe 12 a fraction of the illumination wavelength from an object 14 disposed on the sample stage 11, and a scanner 15 scans the probe 12 over a two-dimensional area of the sample.

The light source 10 is typically a laser of substantially monochromatic wavelength $\lambda$ focused into an optical fiber 19 through a polarizer, a beam splitter and a coupler (collectively not shown). The polarizer and the beam splitter serve to remove stray light from returning reflected light.

The sample stage 11 typically comprises a planar surface supporting the sample 14. The stage 11 can be fixed where the probe is scanned over the sample in two lateral dimensions ("x and y") or the stage 11 can be a moveable portion of a scanning mechanism that moves the sample in one or two of the lateral dimensions.

Conventionally the near-field optical probe is an optical fiber with a very sharp, small diameter point 12. It may be coated with metal except at the point. The portion of the probe adjacent the sample (the active region of the probe) typically has an effective lateral diameter smaller than the wavelength.

The positioner 13 positions the probe tip 12 a fraction of a wavelength $\lambda$ over the sample object 14. The positioner is typically a feedback mechanism. One type of positioner uses a mechanical beam-deflection set-up (not shown) to provide a cantilevered probe. The normal force is monitored using the beam deflection set-up.

The scanner 15 scans the probe in one lateral dimension (e.g. the "y" dimension) and the stage itself can be moved in a second lateral dimension (e.g. the "x" dimension).

The optical detector 16 detects and analyzes light from the illuminated probe/sample. The detector can be a standard optical detector such as an avalanche photodiode, a photomultiplier tube or a charge-coupled device (CCD). The output of the detector 16 is typically processed by a computer 17 programmed with a deconvolution program, and the results are presented on a display 18 as an image.

Depending on the sample being imaged, there are multiple possible modes of operation for a NSOM. In transmission mode operation ("TM"), which is illustrated in FIG. 9, light from the source 10 travels through the probe and transmits through the sample. TM requires a transparent sample. In reflection mode 0peration ("RM"), light travels through the probe and reflects from a sample surface. RM allows for opaque samples. In collection mode operation ("CM"), the sample is illuminated from an outside light source and the probe collects the reflected light. In CM, the probe both illuminates the sample and collects the reflected light. The present invention has application to respective microscopes using each of these modes of operation.

The microscope can be set up to image from any one of several contrast mechanisms including polarization, topography, birefringence, index of refraction, fluorescence, wavelength dependence and reflectivity. Further details concerning the structure and operation of various NSOM systems can be found in the publication L. Novotny and B. Hecht, *Principles of Nano-optics* (Cambridge University Press, Cambridge, 2006), which is incorporated herein by reference.

The optical probe is the key component determining the resolution of the NSOM. When illuminated, it provides a light source with an effective diameter that is small compared with the wavelength of the illumination light and is positioned by the feedback mechanism much closer to the sample surface than the wavelength of the illumination light.

FIG. 10 illustrates a conventional pulled fiber probe 20 providing an illuminated tip 21 closely adjacent the surface of a sample 22. The illuminated tip 21 can optionally contain a nanoparticle 23. The effective diameter of the conventional probe apex (with or without the nanoparticle) is smaller than a wavelength of the illuminating light (it is typically 5-100 nm). The tip 21 is disposed by the feedback mechanism (not shown) to less than an illumination wavelength from the surface of the sample 22 (typically 5-100 nm). FIG. 10 (a) illustrates an apertureless NSOM probe. For better confinement of light, the tip (20) can be coated with a metal film 24 as shown in FIG. 10(b).

Conventional thinking was that obtaining super resolution with NSOM microscopes requires super miniaturization of the probe. It was commonly accepted that in order to increase spatial resolution, the light electromagnetic field should be maximally localized. This was achieved by using extremely small probes in the form of sharp glass or metal tips, fluorescent nanoparticles and dielectric and metal corners. Such miniaturized tips, however, have presented serious problems. First, they are fragile. Fragile tips break and even become unwanted artifacts on the sample. Moreover, in illumination, maximum localization of power on such small areas creates substantial local heating which can change critical dimensions and optical properties. In collection, the miniature probes can collect only a small portion of the light scattered from the sample. Accordingly there is a need for a NSOM having a more robust probe that can collect a large portion of the scattered light while permitting nanoscale resolution.

BRIEF SUMMARY OF THE INVENTION

In accordance with the invention, a near-field optical microscope for imaging nanoscale features is provided with a probe having a distribution of optical discontinuities (perturbations) over a nanoscale or microscale area that is larger than conventional probes. The lateral dimensions of the new probe in the active region near the sample are typically larger than the illumination wavelength and the distribution of perturbations can extend over lateral dimensions wavelength or more in the active region. The discontinuities can generate sharp index gradients and high electric field gradients over regions that are smaller than a wavelength. The discontinuities can be nanoparticles, sharp tips, corners or abrupt index discontinuities. The discontinuities can be nanoscale in size to enrich scattered illumination light with high spatial frequencies corresponding to the small sample features to be resolved. The distribution of the perturbations can be discrete and random, as formed by a random distribution of nanoparticles or it can be continuous and regular, as formed by the circular interface of concentric glass tubes with different indices of refraction. It can also be discrete and regular as formed by a grid of nanoscale peaks. These probes are more robust than the conventional probes and their fabrication does not require nanoscale precision. The probes enable waveguiding of light to and from the sample with marginal losses distributing and utilizing the incident light more completely. Numerical modeling shows that, even with substantial measurement noise, the proposed probes can resolve objects that are significantly smaller than the probe size and, in certain cases, can perform better than miniature nanoprobes. As examples of such near-field probes, we propose and theoretically study the models of optical fibers with end-faces containing sharp linear edges and randomly distributed nanoparticles.

BRIEF DESCRIPTION OF THE DRAWINGS

The file of this patent contains at least one drawing executed in color. Copies of this patent with color drawings will be provided by the Patent and Trademark Office upon request and payment of necessary fee.

The advantages, nature and various additional features of the invention will appear more fully upon consideration of the illustrative embodiments now to be described in detail in connection with the accompanying drawings. In the drawings:

FIG. 4 is a graphical illustration of various point spread functions (PSFs): a—Gaussian PSF $H_1(\rho)$; b—Edged-Gaussian PSF $H_2(\rho)$; c—nanoparticle in a Gaussian beam PSF $H_3(\rho)$; d—randomly positioned nanoparticles in a Gaussian beam PSF $H_4(\rho)$; a1, b1, c1, and d1—cross-sections of PSF distributions a, b, c, and d along the axis y=0.

FIG. 9 is a schematic diagram of a NSOM microscope in which the inventive probes can be used.

FIGS. 10a and 10b are schematic diagrams of conventional NSOM optical probes.

It is to be understood that these drawings are for purposes of illustrating the concepts of the invention and, except for the graphs, are not to scale.

DETAILED DESCRIPTION

This description is divided into two parts: Part I, describes the new and improved optical probes and their use to improve NSOM microscopes. Part II, written for those skilled in the art, provides an analytical explanation of the improved performance of NSOM microscopes using the new probes.

I. The Probes and their Use.

The problem of subwavelength imaging is addressed by the near-field optics, which enables spatial resolution beyond the diffraction limit. It is commonly accepted that, in order to increase the spatial resolution, the electromagnetic field should be maximally localized. This is usually achieved by placing an extremely small probe near a sample. A device consisting of a probe, which electromagnetically scans a sample surface in its immediate vicinity, is called a near-field scanning optical microscope (NSOM). The signal detected by an NSOM is proportional to the electromagnetic field near the probe apex. An NSOM characterizes the optical properties of surfaces with lateral resolution compared to the characteristic dimension $\delta$ of the localized electromagnetic field. For the NSOM with subwavelength resolution, the value of $\delta$ is small compared to the radiation wavelength $\lambda$.

The ultra-small size of a NSOM probe results in dramatic reduction in power of detected signals, which significantly decreases signal-to-noise ratio. In addition, very small probes are extremely fragile and can be destroyed after a single touch. To date, the design of NSOM probes was aimed at creating an electromagnetic field, which is maximally localized near a nano-sized point (miniature apertures, sharp metal tips, fluorescent nano-particles and molecules, dielectric and metal corners. Alternatively, the super-miniaturization of probes can be avoided if the probe field spectrum is enriched with high spatial frequencies.

Figures 1A, 1B, 1C, 1D, 1E, 1F, 1G, 1H:
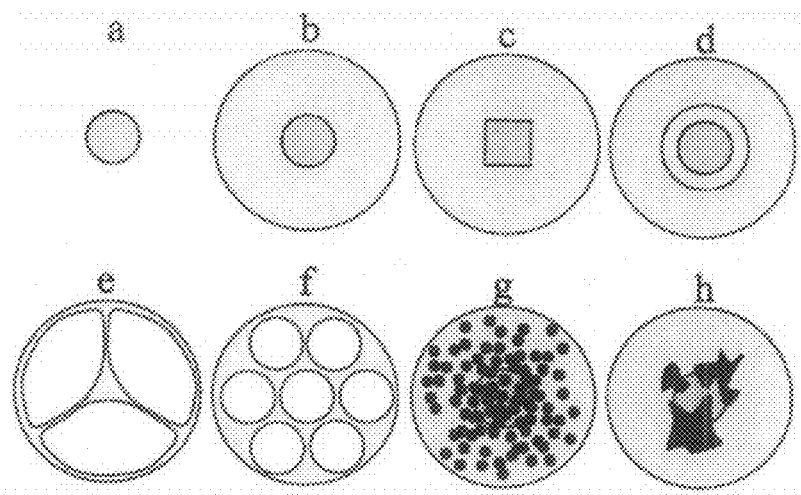
FIG. 1 shows end-faces of fiber probes: (a)—unclad micro/nanofiber; (b)—clad micro/nanofiber; (c)—a fiber with a square core; (d)—multi-layer fiber (e)—air-clad microstructure fiber; (f)—air-core microstructure fiber; (g)—fiber surface with randomly embedded nanoparticles; (h)—fiber surface coated with metal film micro-islands.

It is proposed, in accordance with the present invention, to enrich the probe field with high frequencies by exploiting sharp edges and corners. Such probes formed in accordance with the present invention can be fabricated by cutting (e.g., cleaving and focused ion beam milling) unclad and clad micro/nanofibers and microstructure optical fibers. Examples of such inventive fiber probes with sharp end-face edges are illustrated in FIG. 1(a)-(f). A micro/nanofiber probe with a sharp circular edge is shown in FIG. 1(a). Fabrication of such microfibers, both from regular silica and high-index glass, has been demonstrated. The diameters of such fibers in the active region can range from submicron to a few tens of micron (e.g., 0.2 micron to 30 microns). The edges of glass can be made extremely sharp with the radius of a few nm only. Preferred radii are less than 3 nm. The edge sharpness can be much greater if the cut surface crosses the interface of two materials as, e.g., at the end-face of a clad microfiber illustrated in FIG. 1(b), (c), and (d). The diameters of such fiber can range from 0.2 to 5 micron, and the cladding thickness can range from a micron to a few tens of microns. Other possible models of probes with sharp edges are the cut air-clad and air-core microstructure fibers (untapered or tapered) shown in FIGS. 1(e) and (f), respectively. Air core microstructure fibers include nanoscale or microscale diameter longitudinally extending air channels along the glass fiber. Air cores can range from 10 nm to a few microns (e.g., 10 nm to 3 microns) in effective diameter. (The effective diameter of a non-circular cross section is the diameter of a circle of equal area). Another way to fabricate these inventive larger NSOM probes, which generate a field that contains high-frequency components, is to randomly implant nanoparticles into the probe surface as illustrated in FIG. 1(g). The metal or dielectric nanoparticles generate nonuniformities of the probe field which are rich with high spatial frequencies. Preferred dimensions for such nanoparticles are in the range 1 nm to 100 nm. The nanoparticles can be distributed over a pattern having an effective diameter in the range 50 nm to a few microns with a density in the range $1 \text{ nm}^{-2}$ to $10^{-4} \text{ nm}^{-2}$. Thin film islands with random shape and position shown in FIG. 1(h) can perform similarly. For metal nanoparticles and islands, the nonuniformities can be strongly enhanced at plasmon resonance.

II. Analysis.

Figures 2A, 2B, 2C, 2D:
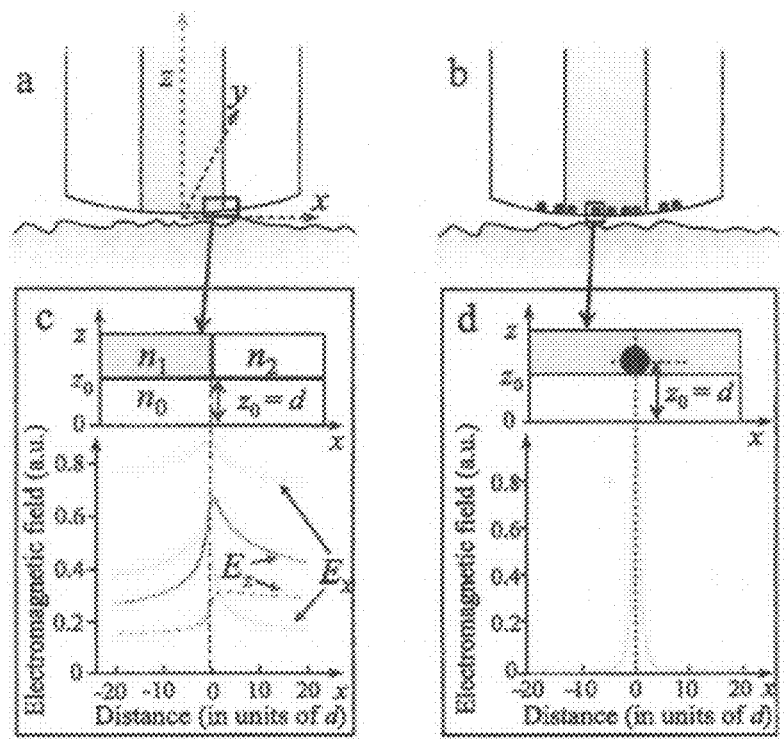
FIG. 2 shows cross-sections of fiber probes: (a) is a cross-section of a clad micro/nanofiber probe. (b)—a cross-section of an optical fiber probe with embedded nanoparticles. (c)—dependence of field components $E_x$ and $E_z$ near the joint edge of the fiber core, fiber cladding and air calculated along the line y=z=0 at distance d δ away from the fiber end-face. Solid curves correspond to $n_0=n_2=1$ and $n_1=2$; dashed curves correspond to $n_0=1$, $n_1=1.8$ and $n_2=1.45$. (d)—dipole field distribution along the line y=z=0 near a nanoparticle.

From the sequence of probes shown in FIG. 1, in this paper we study the characteristic axially symmetric probe with sharp edges illustrated in FIG. 1(b) (which includes the probe of FIG. 1(a) as a particular case) and the probe with randomly distributed nanoparticles illustrated in FIG. 1(g). Another view of these models is also shown in FIGS. 2(a) and (b) where the Cartesian coordinates (x,y,z) are introduced. A sample, with lateral and vertical features much smaller than the radiation wavelength $\lambda$, is positioned at the substrate plane z=0. The fiber probe scans the sample by translation along the plane $z=z_0$ at a distance much smaller that the wavelength, $z_0 \ll \lambda$. The radiation field scattered from the sample is reflected into the probe and generates the detected signal. For simplicity, it is assumed that the measured image distribution (ID), $G(\rho_p)$, considered as a function of the lateral probe coordinates, $\rho_p=(x_p,y_p)$, can be expressed through the sample distribution (SD), $F(\rho)$, by the scalar convolution integral:

$$G(\rho_p) = \int F(\rho) H(\rho_p - \rho) d\rho \tag{1}$$

calculated along the plane $\rho=(x,y)$. The SD $F(\rho)$ characterizes variation of the sample permittivity averaged over a subwavelength interval along the coordinate z normal to the substrate. The point spread function (PSF) $H(\rho)$ characterizes the probe. The PSF smoothes and blurs the SD yielding the measured ID. Eq. (1) is valid under the condition of weak scattering from the sample and applicability of the Born approximation when the sample and the probe can be considered independently. The SD can be reconstructed from ID by Fourier transform (denoted with ^):

$$F(\rho) = \hat{Q}(k), \quad Q(k) = \hat{G}(k)/\hat{H}(k). \tag{2}$$

The Fourier transform of PSF, $\hat{H}(k)$, is called the transfer function (TF). In calculations, in order to avoid small and zero values of denominator of Eq. (2), the TF is regularized with, e.g., Wiener filtering by substitution $\hat{H}(k) \to \hat{H}(k) + \gamma \max(|\hat{H}(k)|^2)/\hat{H}^*(k)$ where $\gamma$ is a small regularization parameter.

For a PSF which is smooth and noticeably greater than the characteristic sample nonuniformity $\delta_s$, the TF is very narrow and reaches the level of measurement noise at spatial frequencies $|k| < \delta_s^{-1}$, which makes the sample irresolvable. However, the TF can be enriched with high frequencies by fragmentation of the NSOM probe, in particular, by exploiting PSFs with nonuniformities generated by edges and embedded nanoparticles.

Figures 3A, 3B:
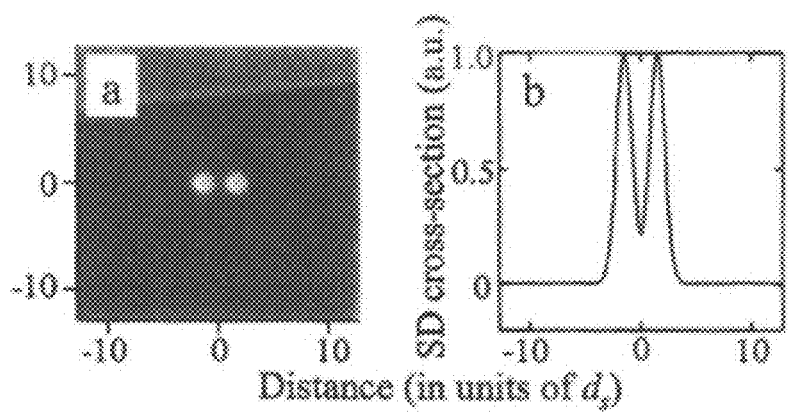
FIG. 3 shows a sample distribution (SD) a—a graphical illustration of a sample distribution; b—the cross-section of the sample distribution along the axis y=z=0.

In our numerical experiments, the sample model, $F_s(\rho)$, is chosen in the form of the sum of two Gaussian peaks, $$F_s(\rho) = \exp[-(|\rho|-1.5\delta_s)^2/\delta_s^2] + \exp[-(|\rho|+1.5\delta_s)^2/\delta_s^2] \tag{3}$$

with characteristic nonuniformity $\delta_s$. Typically, in high-resolution NSOM measurements, $\delta_s \sim 10\text{-}100$ nm. For genericity, in our calculations the value of $\delta_s$ is not specified and used as a scale parameter. The plot of SD $F_s(\rho)$ is depicted in FIG. 3(a) and its cross-section along the axis of symmetry z=y=0 is shown in FIG. 3(b).

Consider first the probe shown in FIGS. 1(b) and 2(a), which has a sharp circular edge formed at the interface of the fiber core and cladding with refractive indices $n_1$ and $n_2$ and air with refractive index $n_0=1$. FIG. 2(c) shows the behavior of electromagnetic field components $E_x$ and $E_z$ near the edge of this probe, which are calculated in the electrostatic approximation for $n_1=2$ and $n_2=1$ (unclad high-index glass microfiber, solid curves) and for $n_1=1.8$ and $n_2=1.45$ (clad high-index glass microfiber, dashed curves). The fields are calculated along the line z=y=0, which is separated by distance δ from the end-face of the probe. The distance variation is measured in units of δ because the field variation scales with δ in the electrostatic limit. For a typical SNOM configuration, δ☐10-100 nm. Based on FIG. 2(c) and characteristic field distribution in micro/nanofibers, we investigate the effect of the probe edge by comparing two models of rotationally symmetric PSFs, $H_1(\rho)$ and $H_2(\rho)$. Function $H_1(\rho)$ is purely Gaussian:

$$H_1(\rho)=\exp(-|\rho|^2/R^2), \quad (4)$$

with and function $H_2(\rho)$ is a sum of $H_1(\rho)$ and a circular edge nonuniformity:

$$H_2(\rho)=\exp(-|\rho|^2/R^2)-0.2\exp(-(R-|\rho|)^2/d^2) \quad (5)$$

The parameters of PSFs $H_1(\rho)$ and $H_2(\rho)$ are chosen so that that the radius of the probe is significantly greater than the sample nonuniformity and the characteristic width of the circular nonuniformity have the same order as the sample nonuniformity:

$$R=5\delta_s, d=\delta_s. \quad (6)$$

The plots of these PSFs are shown in FIGS. 4(a) and (b) and their cross-sections along the axis z=y=0 are shown in FIGS. 4(a1) and (b1), respectively.

Figures 5A, 5B, 5C, 5D, 5E:
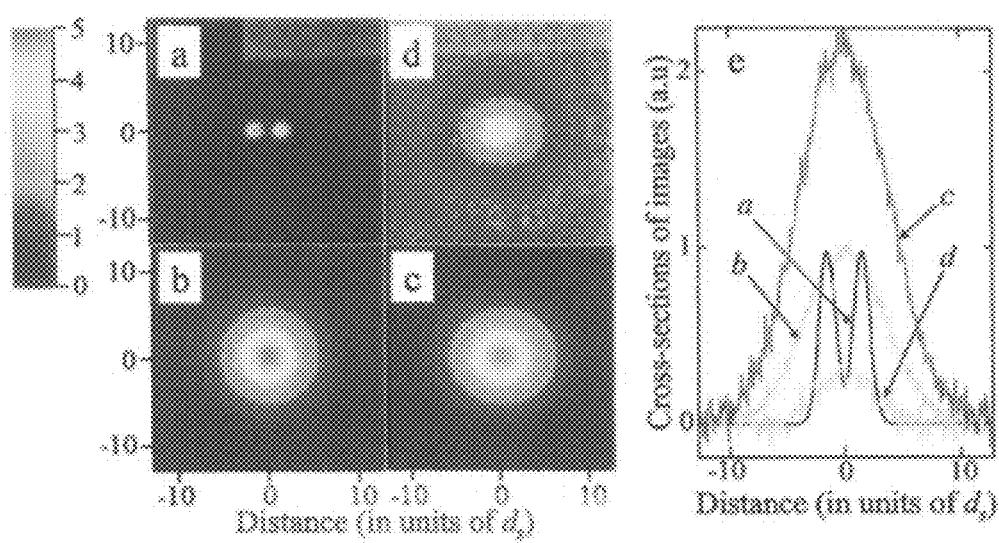
FIG. 5 is a graphical illustration of experimental distributions; (a)—Sample $F_s(\rho)$; (b)—Gaussian PSF $H_1(\rho)$ with noise added; (c)—Image $G_1(\rho)$ with noise added; (d)—Sample distribution reconstructed from noisy ID (d) and PSF; (e)—curves a, b, c, and d are the cross-sections of distributions a, b, c, and d along the axis y=0.
Figures 6A, 6B, 6C, 6D:
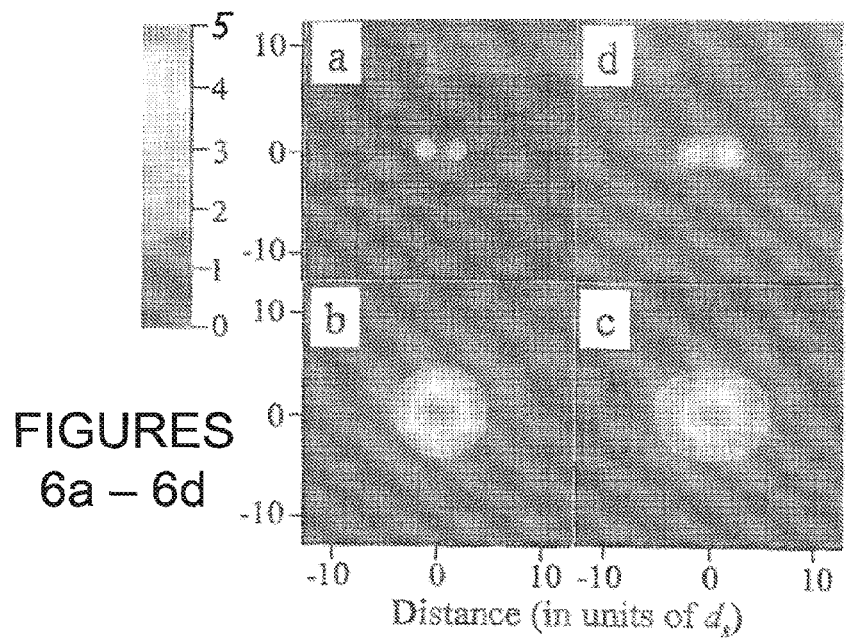
FIG. 6 is a graphical illustration of sample distributions (SD): (a) Sample $F_s(\rho)$; (b)—Edged-Gaussian PSF $H_2(\rho)$ with noise added; (c)—Image $G_2(\rho)$ with noise added; (d)—Sample distribution reconstructed from noisy ID (d) and PSF; (e)—curves a, b, c, and d are the cross-sections of distributions a, b, c, and d along the axis y=0.
Figure 6E:
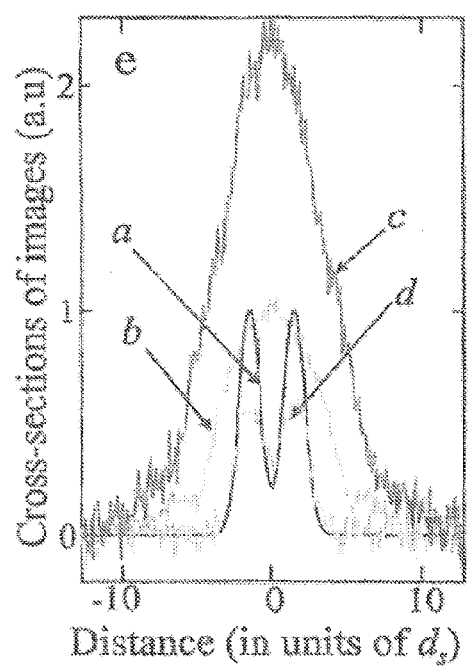

Mathematically, inversion of Eq. (1) and accurate deconvolution of SD $F_s(\rho)$ from PSFs $H_1(\rho)$ and $H_2(\rho)$ and corresponding IDs, $G_1(\rho)$ and $G_2(\rho)$, is possible with appropriate choice of the regularization parameter γ. However, we have found that in order to restore our SD $F_s(\rho)$ with 10% accuracy from its Gaussian ID $G_1(\rho)$, functions $G_1(\rho)$ and $H_1(\rho)$ should be determined with impractical $10^{-6}$% accuracy. With edged PSF $H_2(\rho)$, this accuracy dramatically drops from $10^{-6}$% to 0.2%. Importantly, with even smaller and quite realistic accuracy of measurements, the edged PSF demonstrates remarkable performance. In the numerical experiment presented in FIG. 5, the normally distributed noise with RMS of 3% was introduced into both the Gaussian PSF $H_1(\rho)$ and the ID $G_1(\rho)$. The corresponding noisy distributions of $H_1(\rho)$ and $G_1(\rho)$ are shown in FIGS. 5(b) and (c), and their cross-sections are shown in FIG. 5(e), curves b and c, respectively. It is seen that the introduced noise completely corrupts the sample image and the reconstructed SD shown in FIG. 5(d) has nothing to do with the original one. In contrast, the edged-Gaussian PSF $H_2(\rho)$, with the same noise added, allows to reconstruct the sample $F_s(\rho)$ quite clearly. The noisy distributions of $H_2(\rho)$ and $G_2(\rho)$ are shown in FIGS. 6(b) and (c), and their cross-sections are shown in FIG. 6(e), curves b and c, respectively. The restored SD shown in FIGS. 6(d) and (e), curve d, resembles the original SD of FIG. 6(a) (having, though, noticeable reduction of peak heights). We have found that, in order to reconstruct the SD with the quality similar to that of FIG. 5(d), the noise introduced into the Gaussian PSF and ID should be reduced from 3% to ~$10^{-3}$% RMS. Again, the latter measurement accuracy is hardly possible to achieve experimentally.

Consider now a fiber probe with randomly distributed nanoparticles shown in FIG. 1(g) and FIG. 2(b). For simplicity, we model the field nonuniformity generated by each nanoparticle by an axially symmetric distribution $$E_d(\rho) = \frac{\delta^3}{(|\rho|^2 + \delta^2)^{3/2}} \quad (7)$$

illustrated in FIG. 2(d). The width of the dipole peak is chosen to be comparable with the characteristic size of the sample:

$$\delta=0.5\delta_s \quad (8)$$

For comparison, we consider imaging with the PSF having a single peak generated by a metal nanoparticle placed into a Gaussian beam, $$H_3(\rho)=\exp(-|\rho|^2/R^2)(1+E_d(\rho)), \quad (9)$$

and randomly distributed peaks generated by similar multiple nanoparticles in a Gaussian beam, $$H_4(\rho) = \exp(-|\rho|^2/R^2)\left(1 + \sum_n E_d(\rho - \rho_n)\right) \quad (10)$$

Figures 7A, 7B, 7C, 7D, 7E:
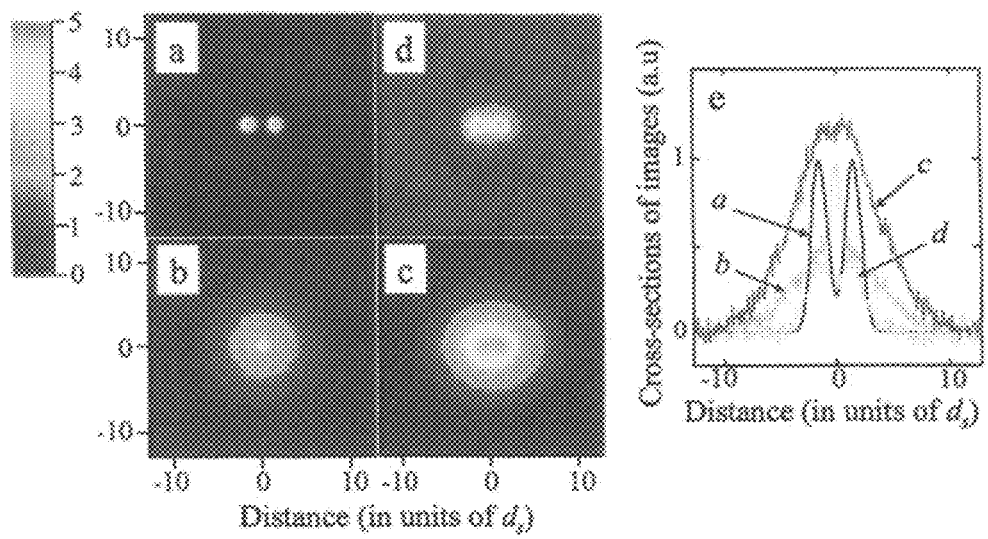
FIG. 7 is a graphical illustration of probe characteristics: (a)—Sample $F_s(\rho)$; (b)—nanoparticle in a Gaussian beam PSF $H_3(\rho)$ with noise added; (c)—Image $G_3(\rho)$ with noise added; (d)—Sample distribution reconstructed from noisy ID (d) and PSF; (e)—curves a, b, c, and d are the cross-sections of distributions a, b, c, and d along the axis y=0.
Figures 8A, 8B, 8C, 8D, 8E:
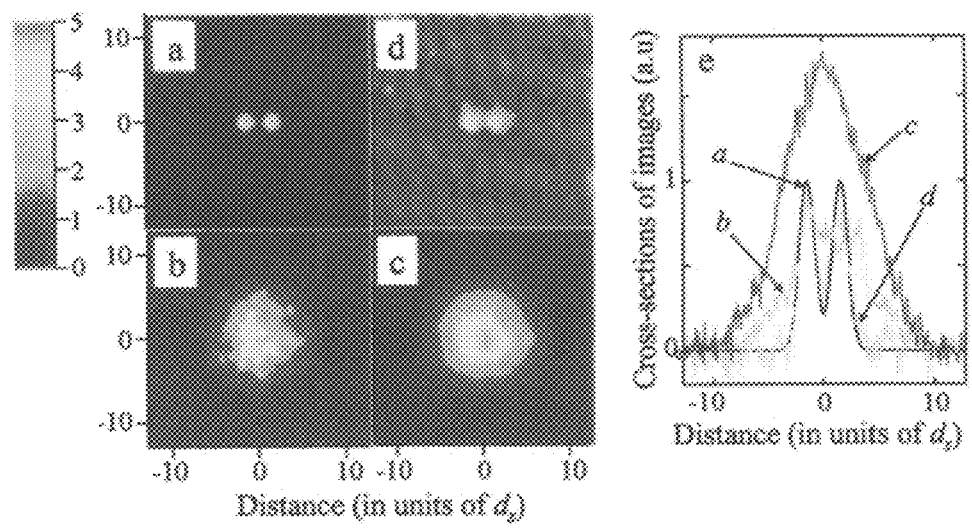
FIG. 8 is a graphical illustration of probe characteristics: (a)—Sample $F_s(\rho)$; (b)—random positioned nanoparticles in a Gaussian beam PSF $H_4(\rho)$ with noise added; (c)—Image $G_4(\rho)$ with noise added; (d)—Sample distribution reconstructed from noisy ID (d) and PSF; (e)—curves a, b, c, and d are the cross-sections of distributions a, b, c, and d along the axis y=0.

The plot of PSFs $H_3(\rho)$ and $H_4(\rho)$ are shown in FIGS. 4(c) and (d) (with cross-sections in FIGS. 4(c1) and (d1)), respectively. Positions of dipoles, $\rho_n$ were chosen to be randomly distributed along the surface of the probe with average density $0.4\delta_s^{-2}$. For example, for $\delta_s$=100 nm, the dipole peak width is $\delta$=0.5$\delta_s$=50 nm and the average density of dipoles is 40 μm$^{-2}$. Similarly to the previous cases, we introduce the 3% RMS noise into all PSFs and IDs which are shown in FIGS. 7(b), (c),(e) and 8(b),(c),(e) for a single and multiple peak cases, respectively. The SD reconstructed by a single peak PSF is shown in FIGS. 7(d) and (e), curve d. Curve d demonstrates that, though the sample peaks are distinguishable, their contrast is low. In comparison, FIGS. 8(d) and (e), curve d, depicts the SD reconstructed with the random PSF shown FIG. 4(d). It is seen that, in spite of larger background noise, the contrast of the reconstructed SD is considerably better than of the SD reconstructed with a single peak PSF.

Experimentally, the complex-shaped PSF can be determined by calibration using a known SD. The simplest SD that can be used for this purpose is a local nonuniformity with dimensions much smaller than dimensions of PSF nonuniformities. Our calculations show that the scaled image $G_0(\rho)$ of a sample Gaussian peak $F_0(\rho)=\exp(-|\rho|^2/d^2)$ with d<0.2$\delta_s$ reproduces the random-particle PSF $H_4(\rho)$ with deviations smaller than 3%. With a 3% RMS noise added, the performance of $G_0(\rho)$ will be similar to the performance of PSF shown in FIG. 8.

In summary, the NSOM fiber probes with sharp edges and randomly distributed nanoparticles enable accurate reconstruction of images that are significantly smaller than the probe size. In particular, a probe with a core size that is comparable to the radiation wavelength λ can resolve a sample with subwavelength accuracy. Fabrication of these probes does not require super-miniaturization of their size. These probes are more robust and enable waveguiding of light between source, sample and detector with marginal losses. Potentially, these probes can exceed resolution obtained with miniature NSOM probes explored to date.

It can now be seen that in one aspect, the invention is a probe for near-field optical microscopy. The probe has an active area for near-field interaction with a sample illuminated by light of a wavelength λ. The active area extends over a lateral dimension in excess of a wavelength λ and comprises a plurality of optical discontinuities that generate sharp index gradients and electrical field gradients over regions that are smaller than a wavelength and which are distributed within the active area over a lateral dimension in excess of a wavelength. The index gradients can be induced by edges, corners, absorbing particles, scattering particles, nanoscale or microscale air bubbles, or emitting particles. The discontinuities can be distributed in a random pattern or in a regular pattern.

Advantageously, the active area of the probe comprises a region having an effective diameter in the range from 0.2 micron to 30 microns. It can be a region of optical fiber having a diameter in the range from 0.2 micron to 3 microns such as a flat or rounded tip of the fiber.

Advantageously, the active area has a cross section with an effective diameter on the order of the exposure wavelength. The discontinuities can comprise nanoparticles distributed with a density in the range of 1 per square nanometer to 1 per 10,000 square nanometers. The nanoparticles can have effective diameters in the range 1 nanometer to 100 nanometers.

The discontinuities can also comprise air core microstructures or air bubbles within an optical fiber. Advantageously the air core microstructures have effective diameters in the range 10 nanometers to 3 microns.

The discontinuities can comprise sharp edges or sharp corners. Advantageously the edges or corners have edge radii of less than 3 nanometers. The active area can comprise the tip of an optical fiber of uniform cross section or the tip of a tapered fiber. The optical fiber can clad, unclad, or microstructured. In an advantageous embodiment, the active region comprises metal or dielectric nanoparticles distributed along the end-face of an optical fiber. The metal or dielectric nanoparticles can be wholly or partially embedded in the optical fiber. Alternatively, the active region can comprise a metal coated microstructure film or metal islands distributed on the end-face of an optical fiber.

In another aspect, the invention is a near-field scanning optical microscope comprising a probe as described above. In addition to the probe, the microscope comprises an illumination light source, a sample stage, a positioning mechanism for positioning the probe a fraction of an illumination wavelength from an object on the sample stage, a scanner for scanning the probe over a two-dimensional area of a sample, and a detector for detecting light from the illuminated sample.

It is to be understood that the above-described embodiments are illustrative of only a few of the many embodiments which can represent applications of the invention. Numerous and varied other arrangements can be made by those skilled in the art without departing from the spirit and scope of the invention.

The invention claimed is:

1. A probe for near-field scanning optical microscopy which has an active area for near-field interaction with a sample illuminated by light of a wavelength λ, the active area extending over a lateral dimension in excess of a wavelength and comprising a plurality of optical discontinuities which generate sharp index gradients and electric field gradients over regions that are smaller than a wavelength and are distributed within the active area over a lateral dimension in excess of a wavelength.

2. The probe of claim 1 wherein the discontinuities are induced by elements selected from the group comprising: edges, corners, absorbing particles, scattering particles, emitting particles and bubbles.

3. The probe of claim 1 wherein the discontinuities are distributed in a random pattern.

4. The probe of claim 1 wherein the discontinuities are distributed in a regular pattern.

5. The probe of claim 1 wherein the active area of the probe comprises a region having a diameter in the range from 0.2 micron to 30 microns.

6. The probe of claim 1 wherein the active area of the probe comprises a region of optical fiber having a diameter in the range from 0.2 micron to 3 microns.

7. The probe of claim 1 wherein the active region comprises a flat or rounded tip of an optical fiber.

8. The probe of claim 1 wherein the discontinuities comprise nanoparticles distributed with a density in the range of 1 per square nanometer to 1 per 10,000 square nanometers.

9. The probe of claim 8 wherein the nanoparticles have effective diameters in the range of 1 nanometer to 100 nanometers.

10. The probe of claim 1 wherein the discontinuities comprise air core microstructures within an optical fiber.

11. The probe of claim 10 wherein the air core microstructures have effective diameters in the range of 10 nanometers to 3 microns.

12. The probe of claim 1 wherein the discontinuities comprise sharp edges/corners.

13. The probe of claim 12 wherein the edges/corners have edge radii of less than 3 nanometers.

14. The probe of claim 1 further comprising a waveguide for guiding light to or from the sample.

15. The probe of claim 1 wherein the active area comprises the tip of a fiber of uniform cross section.

16. The probe of claim 1 wherein the active area comprises the top of a tapered fiber.

17. The probe of claim 1 wherein the active area has a cross-section with an effective diameter on the order of the wavelength.

18. The probe of claim 1 fabricated of an unclad optical fiber.

19. The probe of claim 1 fabricated of a clad optical fiber.

20. The probe of claim 1 fabricated of a microstructured optical fiber.

21. The probe of claim 1 wherein the active region comprises metal or dielectric nanoparticles distributed across the end-face of an optical fiber.

22. The probe of claim 21 wherein the metal or dielectric nanoparticles are wholly or partially embedded in the optical fiber.

23. The probe of claim 1 wherein the active region comprises metal film islands distributed across the end-face of an optical fiber.

24. A near-field scanning optical microscope comprising an illumination light source, a sample stage, a near-field optical probe, a positioning mechanism for positioning the probe a fraction of an illumination wavelength from an object on the sample stage, a scanner for scanning the probe over a two-dimensional area of the sample, a detector for detecting light from the illuminated sample, wherein the probe comprises the probe of claim 1.

25. A near-field scanning optical microscope comprising an illumination light source, a sample stage, a near-field optical probe, a positioning mechanism for positioning the probe a fraction of an illumination wavelength from an object on the sample stage, a scanner for scanning the probe over a two-dimensional area of the sample, a detector for detecting light from the illuminated sample, wherein the probe comprises the probe of claim 2.

26. A near-field scanning optical microscope comprising an illumination light source, a sample stage, a near-field optical probe, a positioning mechanism for positioning the probe a fraction of an illumination wavelength from an object on the sample stage, a scanner for scanning the probe over a two-dimensional area of the sample, a detector for detecting light from the illuminated sample, wherein the probe comprises the probe of claim 5.

27. A near-field scanning optical microscope comprising an illumination light source, a sample stage, a near-field optical probe, a positioning mechanism for positioning the probe a fraction of an illumination wavelength from an object on the sample stage, a scanner for scanning the probe over a two-dimensional area of the sample, a detector for detecting light from the illuminated sample, wherein the probe comprises the probe of claim 6.

* * * * *